United States Patent

Radle, Jr. et al.

[11] Patent Number: 5,938,409
[45] Date of Patent: Aug. 17, 1999

[54] GAS POWERED FLUID PUMP WITH EXHAUST ASSIST VALVE

[75] Inventors: Bernard J. Radle, Jr., Easton; Daniel E. Douro, Coopersburg, both of Pa.

[73] Assignee: Spirax Sarco, Inc., Allentown, Pa.

[21] Appl. No.: 08/658,668

[22] Filed: Jun. 4, 1996

[51] Int. Cl.$^6$ ................................. F04F 1/06; F04F 3/00
[52] U.S. Cl. ...................... 417/133; 417/131; 417/132; 417/135
[58] Field of Search .................... 417/131, 132, 417/133, 135

[56] References Cited

U.S. PATENT DOCUMENTS

| | | | |
|---|---|---|---|
| Re. 34,957 | 5/1995 | Francart, Jr. | 417/133 |
| 1,306,762 | 6/1919 | Higginson | 417/133 |
| 1,397,190 | 11/1921 | Wiggins et al. | 417/132 |
| 1,699,464 | 1/1929 | Dutcher . | |
| 1,767,452 | 6/1930 | Hewitt . | |
| 2,400,651 | 5/1946 | Marsh | 417/131 |
| 2,702,045 | 2/1955 | Graefe | 137/192 |
| 2,832,370 | 4/1958 | Hill | 137/391 |
| 4,025,236 | 5/1977 | Fujiwara | 417/128 |
| 4,192,341 | 3/1980 | Hilmer | 137/445 |
| 4,545,397 | 10/1985 | Yumoto | 137/192 |
| 4,757,837 | 7/1988 | Provost et al. | 137/192 |
| 5,004,405 | 4/1991 | Breslin | 417/131 |
| 5,141,405 | 8/1992 | Francart, Jr. | 417/133 |
| 5,230,361 | 7/1993 | Carr et al. | 137/416 |
| 5,366,349 | 11/1994 | Ilg | 417/132 |
| 5,451,144 | 9/1995 | French | 417/131 |

FOREIGN PATENT DOCUMENTS

| 1025273 | 2/1958 | Germany | 417/131 |
|---|---|---|---|
| 75496 | 6/1916 | Switzerland | 417/131 |

OTHER PUBLICATIONS

Press–Powered Pump Brochure (Spirax–Sarco), dated Dec. 1995.
Installation & Maintenance Manual—GestraPump FPS 14, dated Dec. 1995.
Technical Data Sheet—GestraPump FPS 14.

*Primary Examiner*—Bibhu Mohanty
*Attorney, Agent, or Firm*—Eckert Seamans Cherin & Mellott, LLC

[57] ABSTRACT

A gas powered pump tank is alternately filled with liquid such as water at low pressure, and then emptied by gas pressure such as from pressurized steam. An auxiliary exhaust assist valve opens at a threshold pressure after switching from the pumping phase to the filling phase to more quickly vent the pressure in the tank and minimize obstruction of the incoming flow of liquid. The pump tank has inlet and outlet check valves for the liquid, permitting flow only in a positive pumping direction. A gas inlet valve and a primary gas exhaust valve are controlled by an alternating mechanism such as a float with a snap action toggle that opens one of the gas valves while closing the other. The auxiliary exhaust assist valve has a valve body spring biased inwardly of the tank, and opens at a pressure lower than the pumping pressure, thereby venting the tank more rapidly and also assisting in venting any additional steam produced by boiling of the water or other liquid. The auxiliary exhaust valve can vent into the gas exhaust port, being associated with the primary exhaust valve, or into the open. The auxiliary exhaust valve can be partly controlled, and in particular held closed, by the float toggling mechanism, especially when arranged to vent at a relatively high pressure in proportion to the pumping pressure.

21 Claims, 7 Drawing Sheets

GAS POWERED FLUID PUMP WITH EXHAUST ASSIST VALVE

BACKGROUND OF THE INVENTION

1. Field of the Invention

The invention relates to the field of pumps that employ a fluid under pressure for motive power, for example using steam pressure to pump liquid condensate for removal or recovery of condensate in a steam system, heat exchanger or other pressurized apparatus. In particular the invention concerns an improved pump employing gas under pressure as the fluid displacement means and having a venting valve that opens during the exhaust phase of a pumping cycle to effectively enlarge the exhaust orifice.

2. Prior Art

Pumps powered by gas pressure, especially steam pressure, have a number of benefits for pumping liquids. Such pumps can operate under various conditions of pressure or vacuum, and do not require seals or packings as do pumps powered by rotary machines or having pistons or centrifugal impellers. Pressure driven pumps consume a minimal amount of power and generally provide a durable and cost effective solution to pumping needs in various situations.

A typical pump driven by gas pressure comprises a tank having a liquid inlet and a liquid outlet near the bottom of the tank, with an inlet check valve and an outlet check valve permitting flow only in the pumping direction. The tank also has a gas inlet and a gas exhaust outlet located higher on the tank, above the maximum liquid level. The gas inlet and gas outlet have valves that are operated reciprocally, such that the gas or pressure inlet is open when the gas outlet or exhaust is closed, and vice versa, as a function of the level of liquid in the pump tank. For example, the gas inlet valve and gas outlet valve can be coupled to a float mechanism. Alternatively, the liquid level in the tank can be sensed by electrical level sensors that produce a signal for triggering the gas or pressure inlet/outlet valves to reverse positions. The operation requires a certain hysteresis, with the gas inlet opening and exhaust closing when the fluid level reaches a high threshold level, and remaining in that position until reversing when the fluid level drops below a low threshold. The difference between the thresholds, which can be sensed in a variety of ways, defines the stroke of the pump.

One arrangement in which the liquid level is sensed using a float and the valves are operated mechanically, involves a snap action linkage that simultaneously opens the gas inlet and closes the gas outlet, or closes the gas inlet and opens the gas outlet, at the two thresholds. Examples of such snap action float mechanisms and pumps are disclosed in U.S. Pat. Nos. 5,230,361—Carr et al.; 5,366,349—Ilg; 5,141,405—Francart, Jr.; 1,699,464—Dutcher, etc.

The pump has a cycle including a liquid filling phase and a liquid discharge phase. During the liquid filling phase the gas inlet is closed, the gas outlet is open, and the liquid, which can be water or some other liquid, flows at a relatively low pressure through the liquid inlet check valve to fill the tank. This filling flow can be powered by gravity or another form of low pressure flow. The liquid outlet check valve remains closed because the pressure of the liquid in the tank is relatively low. Tank pressure is low because the gas exhaust valve is open, and the flow line downstream of the outlet check valve may be pressurized as well, either of which keeps the outlet check valve closed. The exhaust valve may vent into the atmosphere, or it may vent into a closed conduit or vessel at a pressure less than the liquid inlet head.

As the float rises in the tank with the level of liquid, the float mechanism reaches a crossover point and toggles the gas valves to open the gas inlet and close the gas outlet, switching from the liquid filling phase of the cycle to the liquid discharge phase. Gas under pressure, such as steam, pressurizes the tank through the gas inlet valve, the gas outlet valve now being closed. Gas pressure builds in the tank, reverse biases the liquid inlet check valve, and forward biases the liquid outlet check valve. The liquid in the tank is forced by gas pressure through the liquid outlet check valve and downstream of the pump, at the pressure of the steam or other gas. When the float drops past a low crossover point, the gas inlet valve closes and the gas outlet valve opens, venting the pressure in the tank and permitting the cycle to repeat.

In this manner the tank alternately fills with low pressure liquid and discharges at higher pressure through the liquid outlet. The pump is useful for returning or inserting liquid such as water into a pressurized system using the pressure in the system as the motive pumping force. This is particularly useful in connection with steam power and heat exchange systems. However, all that is needed is a pressure differential. Thus the pump is useful in closed loop arrangement in which one or more of the inlet liquid feed to the tank, the gas exhaust from the tank and the outlet, are at elevated pressure as compared to ambient.

Although a pressure pump as described is durable and useful, there are certain limitations inherent in its structure, resulting in limitations on the flow or pumping capacity of the pump. Inasmuch as liquid filling typically is accomplished at low differential pressure (e.g., by gravity), the liquid fill rate can be slow. Moreover, when switching from the pressurized pump-out phase to the vented exhaust and filling stage, time is required to permit the gas pressure in the tank to vent before low pressure liquid can begin to fill the tank through the liquid inlet check valve. The time taken to reduce the internal tank pressure to a lower pressure than the inlet line depends on several factors including the extent to which the tank was pressurized and the internal diameter and back pressure of the gas exhaust valve and conduit. The need to vent and reduce tank pressure to shift from positive to negative pressure differentials between the tank and the liquid inlet (to open the inlet check valve and allow an in-flow) and between the tank and the liquid outlet (to close the outlet check valve), respectively, provide an inherent cycling delay and a corresponding limitation on the flow rate of the pump.

Where the liquid being pumped is water and the gas pressure is provided by pressurized steam, limitations on pumping and flow capacity are aggravated because in the pumping phase the pressurized steam heats the walls of the tank, which can reach a temperature higher than the boiling point of water at the lower pressure characteristic of the filling phase. In that case, water flowing initially into the tank through the inlet check valve (as well as residual water already in the tank) boils and generates additional steam and pressure that must be vented through the exhaust valve. Inlet water that is already near boiling temperature is of course more prone to boil when it contacts the steam-heated walls of the tank. The flow restriction caused by the exhaust valve limits the extent to which the motive steam pressure and the boiling water steam pressure can vent.

It would be possible to provide a very large exhaust orifice in order to vent the tank quickly when switching from the pressurized pumping phase to the venting fill phase. However, the exhaust valve must be forced open against the pressure in the tank at the point of the switchover from pumping to filling, for example by the force generated by the spring of a snapover float mechanism.

Where the gas inlet and outlet valves are linked mechanically, the device that opens the gas inlet valve and closes the gas outlet valve is opposed by differential pressure between the pressure source and the tank for opening the inlet to commence a pumping phase, and between the tank and the vent for opening the outlet valve to commence a filling phase. In a pump vented to the atmosphere the pressure differential in each case is substantially equal to the difference between the gas supply pressure and ambient pressure. Or in a closed system the differential is between the pressures of the gas supply and the vent line. If one chooses to enlarge the orifice size of the exhaust valve to speed or improve venting, the surface area of the exhaust valve body is increased. As a result, a correspondingly larger force is needed to open the exhaust valve against the pressure differential, because the same force per unit of area is applied to a larger area. It is not desirable to add heavier springs or other expensive mechanical features to the mechanism that operates the respective valves. Likewise, larger valves are generally more expensive and technically demanding than smaller ones, particularly for high pressure applications.

What is needed is a means to reduce the flow restriction at the exhaust of a pump, that is to enlarge the exhaust orifice, without the drawbacks of a large valve including the need to obtain added mechanical opening force in the valve operating mechanism. Further, the exhaust valve structure should deal with the problem of venting steam generated by water boiling upon flowing into a superheated tank or upon a drop in tank pressure, such that the steam does not substantially slow the venting of pressure or the inflow of water.

SUMMARY OF THE INVENTION

It is an object of the invention to provide a large exhaust vent in a pump for liquids driven by gas pressure, especially in a steam pressure pump for pumping water.

It is also an object of the invention to provide an auxiliary exhaust valve in a pump driven by gas pressure, that is biased to open at a pressure that is lower than a pressure at which a primary exhaust valve opens, and effectively increases the orifice size available for exhaust without increasing the force needed to open the primary valve.

It is another object of the invention to provide a spring biased auxiliary valve as described that optionally can by incorporated as an element of the primary valve mechanism, forming two valve stages that permit a larger exhaust orifice.

It is another object of the invention to open a primary exhaust valve in a pressure operated pump using a primary exhaust valve that is opened at high tank pressure, for example by a float or other mechanism, such that tank pressure drops below a threshold pressure applicable to an inlet check valve, and also to open a secondary valve at a pressure below the high tank pressure, such that steam generated by water boiling in the tank cannot produce a pressure substantially opposing inflow of the water.

These and other objects are accomplished by a pump with a tank that is alternately filled with liquid such as water at a differential pressure only slightly above a tank pressure when vented, and then emptied by application of gas at pressure, such as pressurized steam. The tank inlet and outlet are restricted by check valves allowing flow only from the inlet into the tank and from the tank into the outlet, based on differential pressure. A gas inlet valve couples the tank to pressurized gas to enable pressurization for forcing the liquid into the outlet, and a gas exhaust port valve vents pressure from the tank for enabling refilling with liquid at a low differential pressure above the pressure of the vented exhaust port, for example by gravity feed at minimal head in a pump vented to the atmosphere. The gas inlet valve for pressurization and the exhaust port valve for venting are operated by an alternating mechanism, such as a float with a snap action spring toggle. The mechanism opens the gas inlet while closing the exhaust during a pumping phase, which reverse biases the liquid inlet check valve and discharges liquid into the outlet. The liquid level falls in the tank and the mechanism switches into the filling phase. The mechanism then opens the exhaust valve while closing the gas inlet. As pressure drops, the inlet check valve becomes forward biased and the tank refills with liquid for another pumping cycle. An auxiliary exhaust assist valve opens at a threshold pressure after switching from the pumping phase to the filling phase to more quickly vent the pressure in the tank and minimize obstruction of the incoming flow of liquid. The auxiliary pressure exhaust valve has a valve body biased inwardly of the tank, closed against spring bias by high pressure in the tank, and otherwise normally open for venting. The auxiliary valve opens at a pressure lower than the pumping pressure generated by the steam, venting the tank rapidly after slower initial venting through the primary exhaust valve upon switching into the exhaust phase. The auxiliary pressure exhaust also assists in venting additional steam produced by boiling of the water or other liquid. The auxiliary exhaust valve can vent into the gas exhaust port, being associated with the primary exhaust valve, or into the open.

Accordingly, the invention concerns a method including coupling a tank to a liquid source and a liquid outlet via check valves openable by positive pressure differentials in a forward pumping direction from the source to the outlet. Water or other liquid flows into the tank at low pressure, absent sufficient pressure in the tank to close the inlet check valve. A supply of pressurized gas, especially steam, is coupled through a gas inlet port of the tank by opening an associated a gas inlet valve at the gas inlet port and closing a gas exhaust valve associated with a gas exhaust port. Pressurizing the tank in this manner develops pumping pressure to displace the water (or other liquid), for forcing the water from the tank into the liquid outlet, which can be maintained at substantially the pressure of the steam supply. When the water level falls, for example as detected by a float coupled to the gas inlet and exhaust valves or by another means, the gas inlet valve is closed and the gas exhaust valve is opened. Pressure in the tank begins to fall and the outlet check valve closes. When the pressure in the tank drops to a threshold pressure below the pumping pressure, the auxiliary gas exhaust valve opens due to its bias, thereby venting the tank through a total exhaust orifice larger than the primary exhaust valve, and assisting in reducing pressure in the tank. In this manner the tank can refill more quickly than in a comparable structure venting only through the primary exhaust valve. Should steam be generated due to boiling of water in the tank, such as water flowing into the tank when the tank was superheated during the previous pump cycle by the steam, this steam can be readily vented and does not oppose the flow of water into the tank.

The auxiliary valve has a valve body biased to open inwardly of the tank from its valve seat, via a spring that preferably is threadably adjustable for controlling the biasing force. A float operated snap mechanism can switch between filling the tank with liquid and pumping the liquid, and this mechanism can be used in part to hold closed the auxiliary valve body, for example in a multi-stage valve structure wherein the valve body of the primary valve is seated at an orifice in the valve body of the auxiliary valve, which is in turn seated at a larger orifice defining the opening of the auxiliary exhaust valve.

A number of additional objects and aspects of the invention will be apparent in connection with the following examples of practical embodiments.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
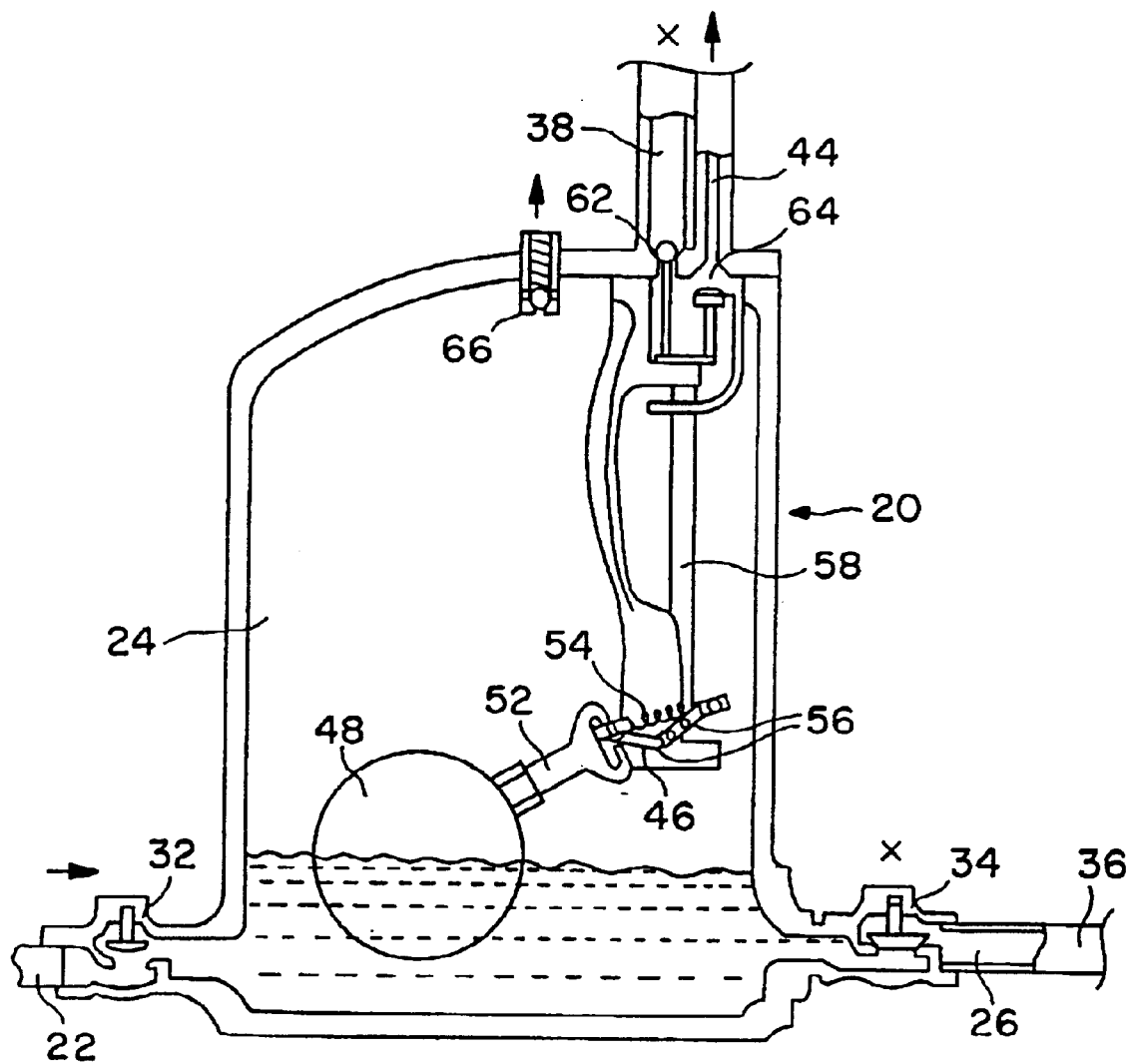
FIG. 1 is a section view through a gas pressure driven pump with exhaust assist valve according to the invention, shown in the filling phase of the pump cycle.
Figure 2:
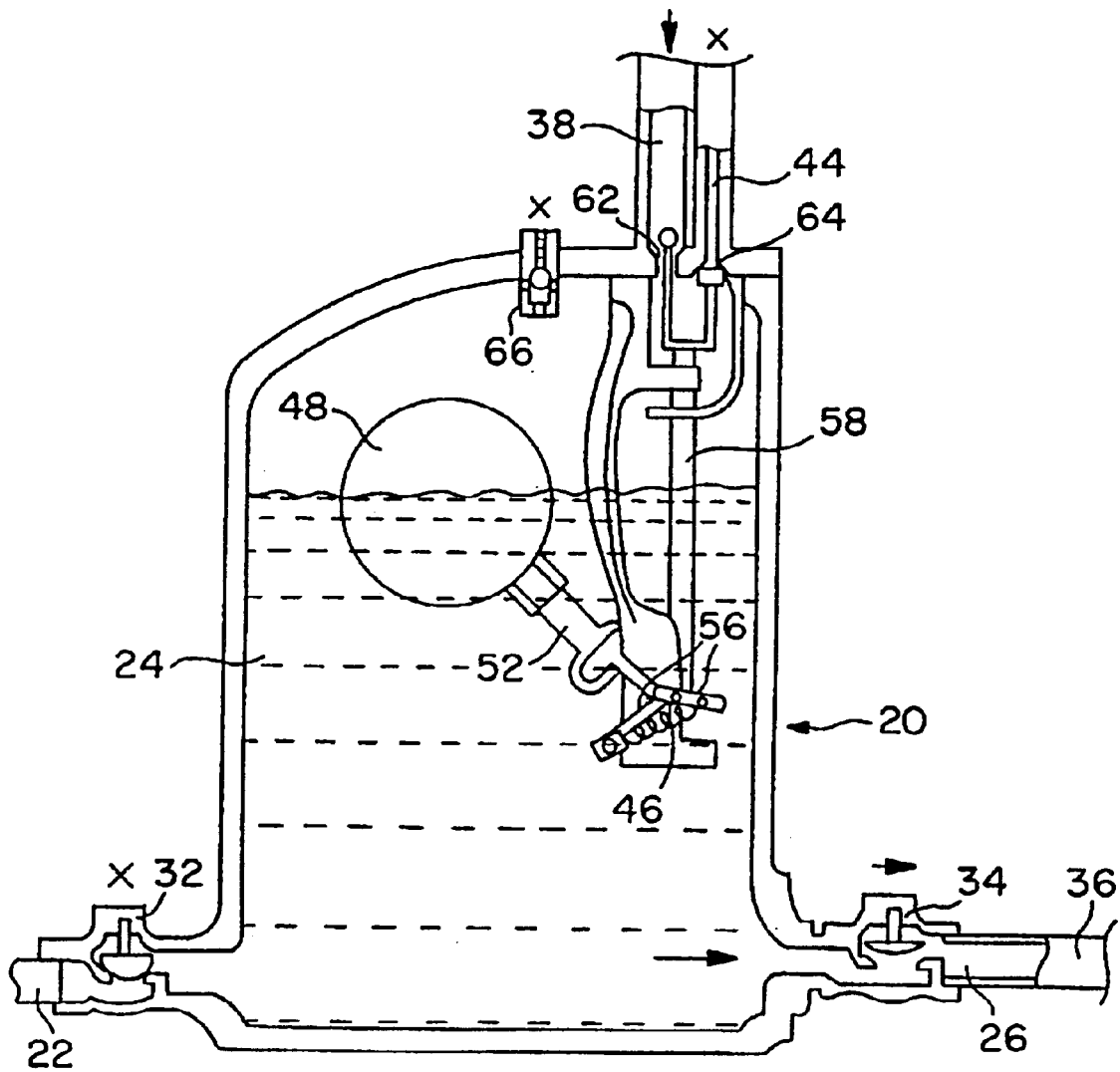
FIG. 2 is a section view through the pump according to FIG. 1, shown in the pumping or discharge phase of the pump cycle.

FIGS. 1 and 2 sectionally show an exemplary gas pressure driven pump 20 according to the invention. In general, pump 20 operates on a positive displacement principal to pump liquid from a liquid inlet 22 of a tank 24 to a liquid outlet 26. Rather than reciprocating a piston in a chamber, pump 20 alternately reduces pressure in the tank (FIG. 1) to allow tank 24 to fill with liquid, and then pressurizes the tank (FIG. 2) to displace the liquid from tank 24 into outlet 26. Check valves 32, 34 at the liquid inlet 22 and outlet 26, respectively, permit flow only in a positive pumping direction, namely from liquid inlet 22 into pump tank 24 and from pump tank 24 to liquid outlet 26.

The liquid supplied at inlet 22 can be only slightly above the pressure of the tank when vented (i.e., the pressure of the gas exhaust port), and at relatively low pressure compared to the gas pressure employed for pumping. For example in an open arrangement that exhausts to atmospheric pressure, the liquid at inlet 22 can be fed by gravity at a minimal head. In a closed system the various lines and conduits can be at a pressure higher or lower than atmospheric pressure, provided there is a positive pressure differential between the liquid inlet and the gas vent, and between the gas supply and each of the other lines and conduits.

Pressurizing pump tank 24 as in FIG. 2 from the gas supply closes inlet check valve 32 and opens outlet check valve 34, whereas depressurizing or venting the pump as in FIG. 1 closes outlet check valve 34 and opens inlet check valve 32. Therefore, the outlet conduit 36 downstream of pump 20 can be maintained at a pressure comparable to the gas supply pressure used for pumping. This aspect makes the pump useful, for example, as a means to recover liquid condensate in a pressurized steam system, for return into the system at pressure, using the steam pressure itself for motive power.

Pump tank 24 has a gas inlet port 38 coupleable to a source of pressurized gas (not shown in FIGS. 1 and 2) for pressurizing pump tank 24, and a gas exhaust port 44 for venting pressure in pump tank 24 into a venting conduit or into the atmosphere. In a typical application, the gas supply is pressurized steam and the liquid to be pumped is water. Other liquids can be pumped in this manner as well, and other types of gas at pressure can be employed in lieu of steam. In this description, steam and water are intended to be nonlimiting examples of particular pressurized gases and pumped liquids that can be involved.

Pump 20 can be switched back and forth between the filling phase of its cycle and the pumping phase by any of various mechanisms that are sensitive to the quantity of fluid in the tank. For example, level sensors can be provided to control operation of solenoid powered gas valves (not shown). The gas valves can be operated mechanically by one or more floats. The gas valves can be operated as a function of the difference in weight between a full tank and an empty one, etc. In the exemplary embodiment shown, the gas valves are mechanically coupled and are operated by a snap-over mechanism 46. A float 48 is mounted on an arm 52 coupled to a bistable linkage having a spring 54 and two pivoted links 56. Spring 54 is coupled to links 56 such that one of the links, coupled to a connecting arm 58, is urged toward either of two opposite positions, causing the mechanism to snap from one position to the other when reaching a cross-over liquid level as sensed by float 48. Connecting arm 58 is coupled to a pressure inlet valve 62 for gas inlet port 38, and a pressure exhaust valve 64 for gas exhaust port 44. In this embodiment the gas inlet valve 62 and the gas exhaust valve 64 seat in opposite directions. Therefore, when one is opened by float mechanism 46 and connecting arm 58, the other is closed, and vice-versa. The pump cycles alternately between a filling phase and a pumping phase. In the filling phase, with the pressure inlet valve 62 closed and the pressure exhaust valve 64 open, tank 24 depressurizes, allowing liquid to flow into the tank and lifting the float. When the float reaches the position in FIG. 2, the mechanism toggles over into the pumping phase with the pressure inlet 62 open and the pressure exhaust 64 closed, forcing tank 24 to empty into outlet conduit 36. The float falls to the position in FIG. 1 and the mechanism toggles back into the filling phase, and so on, controlled by the changing liquid level in the tank.

Pumps of the foregoing general description are disclosed, for example, in U.S. Pat. Nos. 5,230,361—Carr et al.; 5,366,349—Ilg; 5,141,405—Francart, Jr.; and 1,699,464—Dutcher, the disclosures of which are hereby incorporated. The snap action float mechanisms of these devices are intended to switch rapidly from pumping to filling or vice-versa, and to positively move the gas inlet and exhaust valves 62, 64 between their two positions. The invention is applicable to this type and other types of mechanisms. When switching from pumping to filling, however rapidly and by whatever means, it takes time for the gas pressure in tank 24 to fall sufficiently to open inlet check valve 32, due to the flow restriction of the gas exhaust valve orifice.

In relatively hot applications such as steam driven hot water systems, the reduction of pressure in tank 24 upon opening exhaust valve 64 can cause water in tank 24 to boil, producing additional steam that needs to be vented. In hot applications, after inlet check valve 32 opens, water flowing into tank 24 also may boil due to heat energy transferred from the superheated walls of the tank, which had previously been subjected in the pumping phase to high pressure steam. Steam or gas pressure is needed as the motive means for displacing the liquid during the pumping phase. Upon switching to the filling phase, it is advantageous to vent tank pressure quickly and to keep it vented, because in the filling phase, any pressure in the tank exceeding the head of the inlet liquid closes check valve 32, and even pressure less than the inlet head inhibits filling by slowing the flow of liquid into the tank.

According to the invention, an auxiliary pressure exhaust valve 66 is coupled to tank 24 and is opened to assist in venting after switching into the filling phase of the cycle. The auxiliary pressure exhaust valve 66 has a valve body 68 biased to open in a direction inwardly of tank 24. The auxiliary valve body 68 can be simply urged by a spring 72 against the internal pressure of tank 24, to move during the filling phase toward a retained open position. During the pumping phase, the auxiliary valve body 68 is urged outwardly by pressure in tank 24 and resides against its valve seat 74, to close the auxiliary exhaust valve 66.

The spring bias urging auxiliary exhaust valve 66 to open is such that the opening bias is lower than the gas pressure in the tank during the pump phase, and higher than the head or delivery pressure of the incoming water or other liquid. Thus, when the primary exhaust valve 64 opens, venting occurs exclusively through primary exhaust valve 64 for a time, before auxiliary exhaust valve 66 opens due to spring bias. When the auxiliary exhaust valve opens, the remaining pressure in the tank drops off quickly and tends to remain low notwithstanding the generation of steam, because the total orifice size effecting exhaust is enlarged compared to a comparable pump without auxiliary valve 66. Thus, tank pressure, including that from steam produced by boiling, does not substantially retard filling of the pump.

Figure 3:
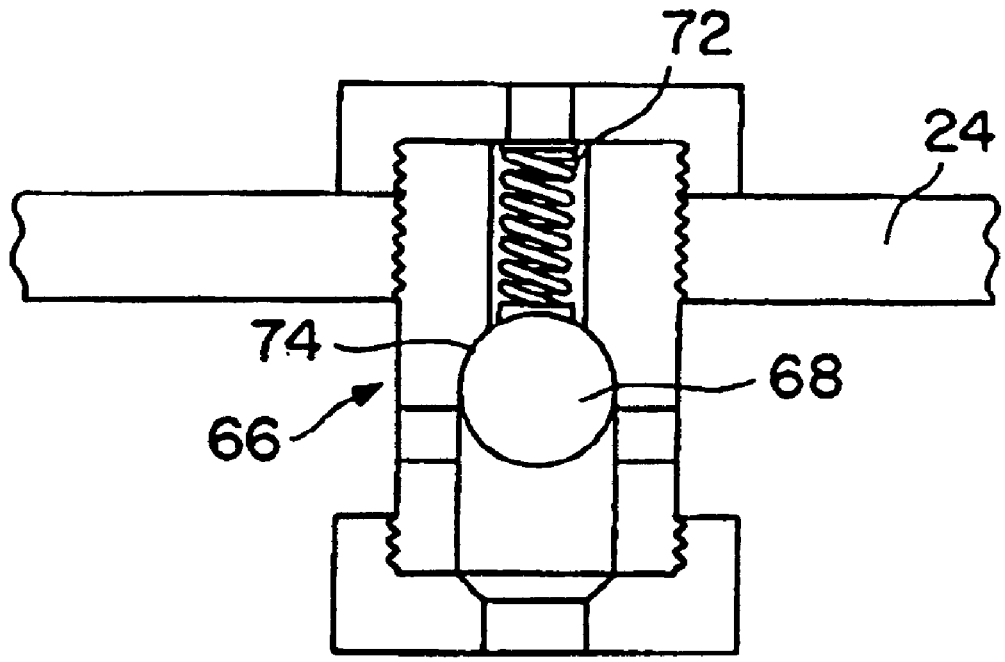
FIG. 3 is a partial section view through an exemplary exhaust assist valve, shown closed.
Figure 4:
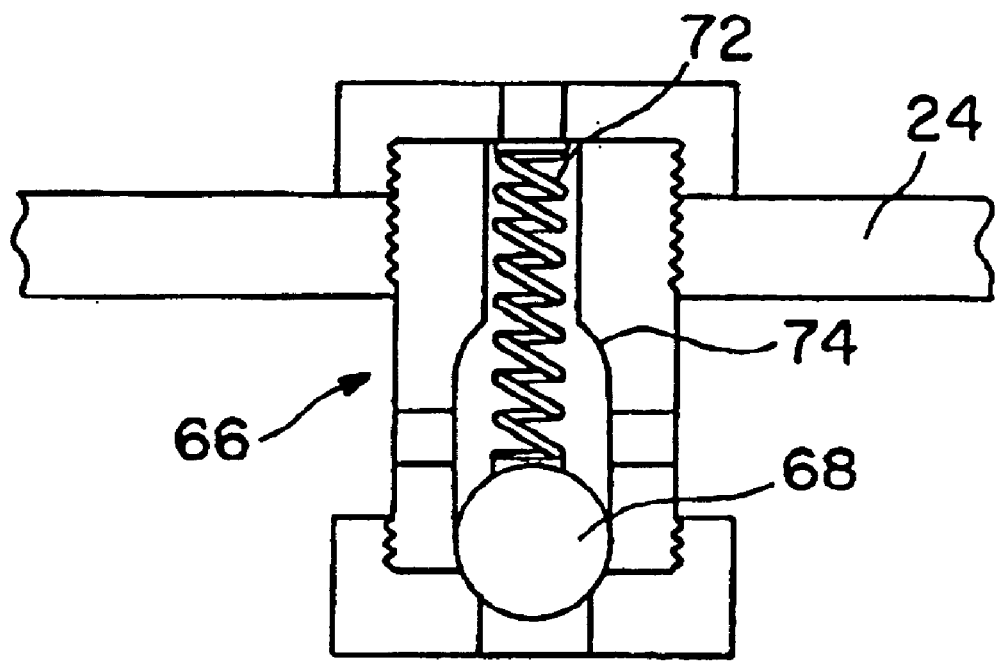
FIG. 4 is a partial section view through the valve of FIG. 3, shown open.

The auxiliary pressure exhaust valve 66 is mounted in a wall of tank 24 at a higher elevation than the level of the liquid, at least above the level of liquid remaining in the tank when the auxiliary exhaust valve opens, for example in the top wall of tank 24 adjacent to primary valves 62, 64. FIGS. 3 and 4 show a possible construction for the valve in a section view, using the same reference numbers to identify corresponding elements. Auxiliary valve 66 can have a spherical or disk shaped valve body 68, urged by spring 72 toward a retained position (FIG. 4) in which a flowpath is provided through the wall of tank 24, or forced by tank pressure toward a seated position (FIG. 3) in which valve body 68 blocks the flowpath.

The particular spring bias pressure and orifice size of the auxiliary pressure exhaust valve 66 can be varied as a function of gas pressure, inlet liquid delivery pressure and desired pumping speed. To deal with steam from boiling of inlet water, the spring bias of auxiliary exhaust valve 66 can be just slightly higher than the pressure at which the inlet check valve opens. For example, assuming a low pressure gravity feed liquid inlet at about 0.75 to 1.0 psig, the auxiliary exhaust valve can be biased to open at 2.0 or 3.0 psig.

In a hot water and steam system in which the inlet water is gravity fed and at only about 1 psig, steam generated due to moderate boiling of inlet water flowing into tank 24 could generate sufficient pressure to slow substantially the flow of inlet water into the tank. A typical hot water and steam system, for example, may operate at 75 psig steam pressure and have 2 inch (5 cm) internal diameter water flow conduits and 0.25 to 0.5 inch (1–2 cm) diameter gas valve orifices. In that case, a 30 to 35 second filling phase may be typical for filling a 1.5 cubic foot (42 liter) tank with boiling water, versus about 10 seconds if not boiling. Part of the time needed in the filling phase is to vent pressure before inlet check valve 32 opens, and part of the time is devoted to inflow, obstructed somewhat by residual pressure or newly generated steam pressure. However, by providing an auxiliary exhaust valve that opens at a pressure slightly above the inlet water pressure, it has been found that the filling time can be reduced substantially. A relatively small auxiliary exhaust valve, for example with a 0.25 inch (6.3 mm) diameter orifice, reduced the time of the filling cycle by 5 to 6 seconds, or a 15 to 20% saving. A larger orifice, for example with a 1 inch (2.5 cm) orifice, can reduce the length of the venting/filling phase by 50%.

According to a further aspect of the invention, auxiliary exhaust valve 66 can further assist in venting gas pressure from tank 24 after switching into the filling phase and before inlet check valve 32 opens, by being biased to open at a relatively higher pressure. It would be possible to have an opening pressure of the auxiliary exhaust valve that approaches the pumping pressure of the gas, which is typically anywhere from 5 to 150 psig. However, this would vent steam until the pressure in tank 24 could be brought up enough to close auxiliary exhaust valve 66. When switching from the filling phase to the pumping phase, it is desirable for the auxiliary exhaust valve to close promptly so as not to retard the rate at which pressure builds up in the tank during the pumping phase. Therefore, the auxiliary valve threshold of operation normally should be a relatively small proportion of the pumping pressure, e.g., 10 to 25%.

Figure 5:
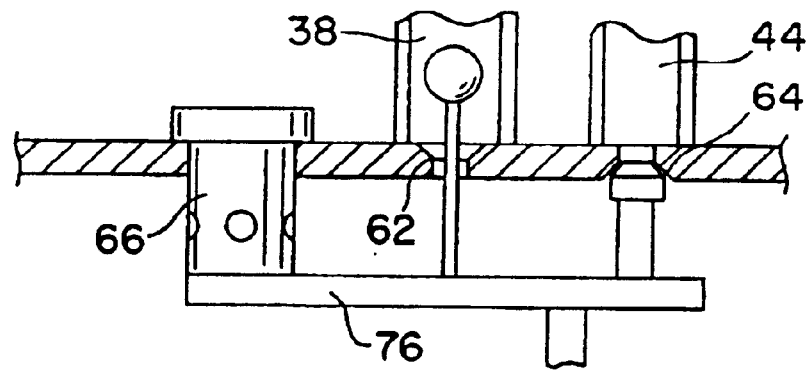
FIG. 5 is a partial section view through the tank wall, according to an alternative embodiment wherein the float mechanism partly controls the auxiliary exhaust assist valve, shown in the pumping (discharge) phase.
Figure 6:
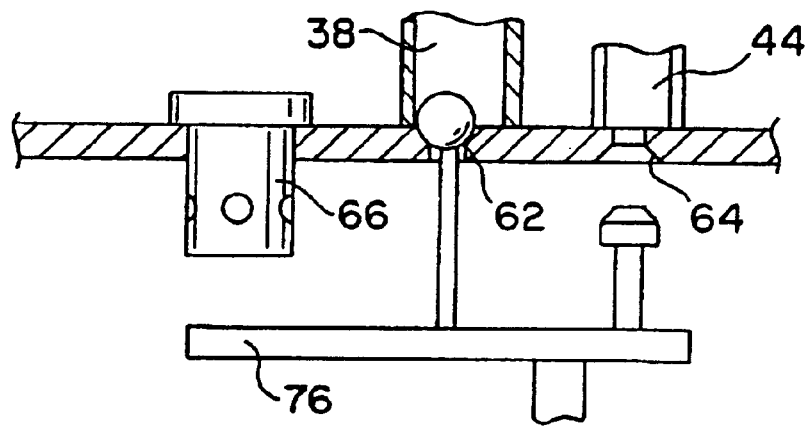
FIG. 6 is a partial section view as in FIG. 5, shown in the initial stage of the exhaust/filling phase.
Figure 7:
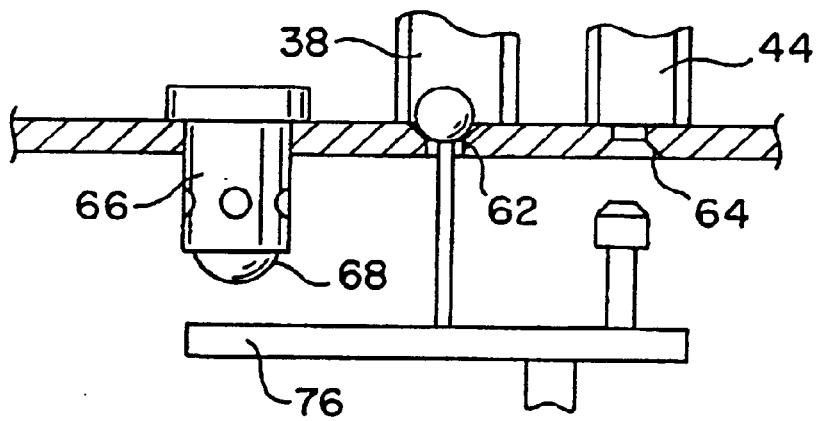
FIG. 7 is a partial section view as in FIG. 5, shown later in the exhaust/filling phase after tank pressure has dropped.

According to a further aspect, however, the auxiliary valve threshold of operation can be made a relatively larger proportion of the pumping pressure without venting steam during commencement of the pumping phase. This is accomplished, for example as shown in FIGS. 5–7, by linking auxiliary valve 66 mechanically to the float mechanism that operates the primary exhaust and gas pressure valves 62, 64. In this embodiment, the connecting member of the liquid level responsive mechanism is provided with an extension 76 that contacts valve body 68 to positively close auxiliary exhaust gas pressure valve 66 when the device is in the pumping cycle as shown in FIG. 5. Extension 76 likewise releases the auxiliary exhaust valve in the filling cycle. However, auxiliary exhaust valve 66 is biased to open at a pressure below the pumping pressure. Thus, pressure vents from the tank exclusively through primary exhaust valve 64 when first switching into the filling phase as in FIG. 6. When the pressure drops to the threshold pressure at which auxiliary exhaust valve 66 opens due to its spring bias (FIG. 7), tank pressure vents through both the primary and auxiliary exhaust valves 64, 66. Thus, this embodiment has a plural stage exhaust or venting sequence in which the total orifice size is increased (by opening of auxiliary valve 66) as the pressure drops.

Figure 8:
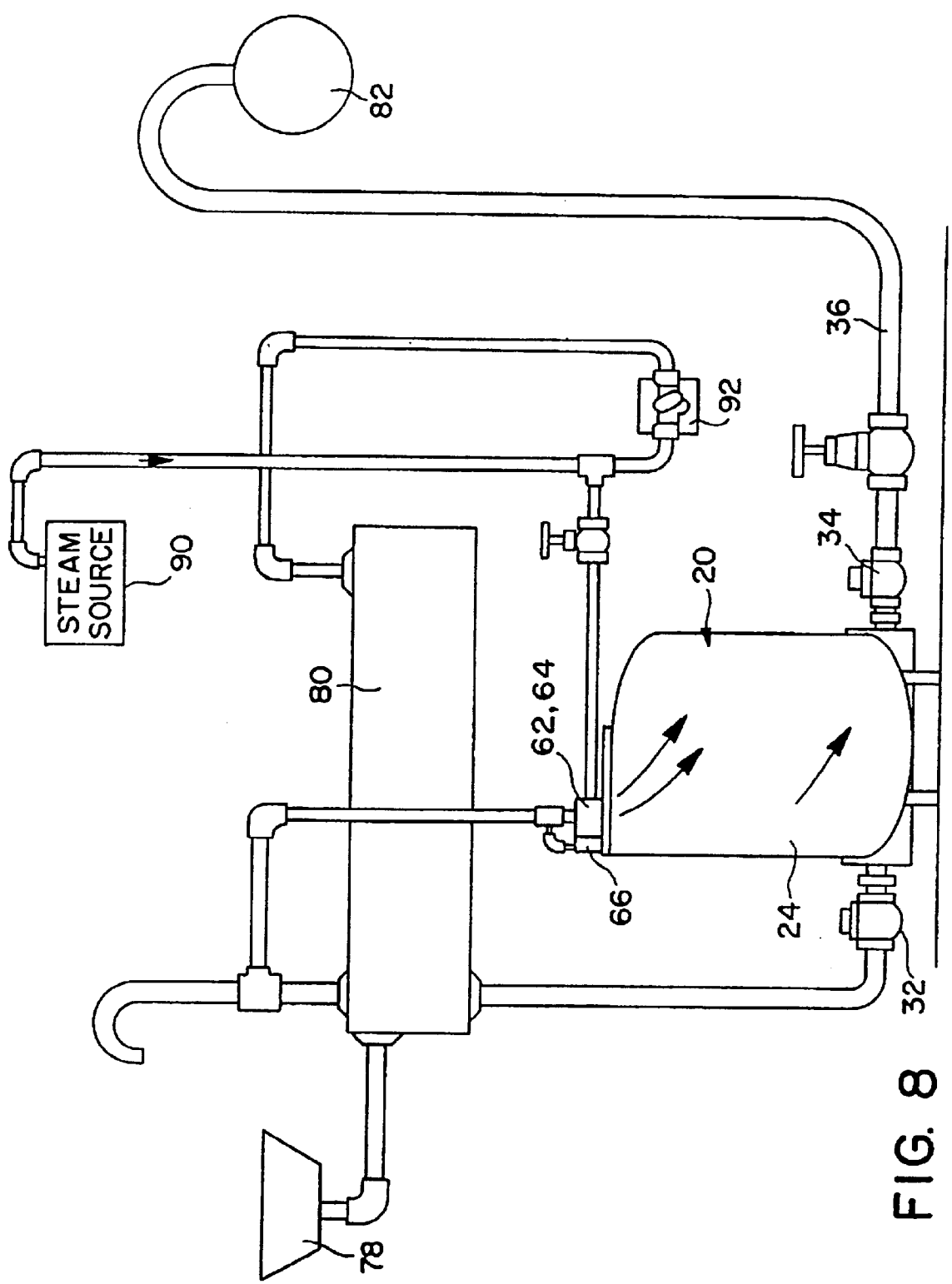
FIG. 8 is a schematic illustration of an application of the invention to a steam driven condensate recovery system.

Auxiliary exhaust valve 66 can vent the tank into the same location as primary exhaust valve 64, namely exhaust port 44. Where the auxiliary exhaust valve 66 is opened at a relatively low pressure, e.g., just slightly higher than the head pressure of the incoming water or other liquid, auxiliary exhaust valve 66 can simply vent into the open. FIG. 8 schematically shows how the pump of the invention can be arranged in a condensate recovery system. Liquid collected at a collection means 78 and in a reservoir 80 is coupled to inlet check valve 32 of pump 20, providing at least a minimal head or inlet pressure. A boiler or other pressurized steam source 90 is coupled to pump 20 to supply gas pressure. Source 90 also can be coupled to a steam trap 92 where water accumulated in the steam conduit can be moved by steam pressure back into reservoir 80. Pump 20 operates in its filling and pumping phases to repetitively force water flowing in from reservoir 20, out through check valve 34, which is coupled by outlet conduit 36 to a pressurized vessel 82. Vessel 82 can then feed a heat exchanger or other apparatus in a known manner, condensate being collected at collector 78, recovered and repressurized by operation of pump 20, for re-use in a circulating manner.

Figure 9A:
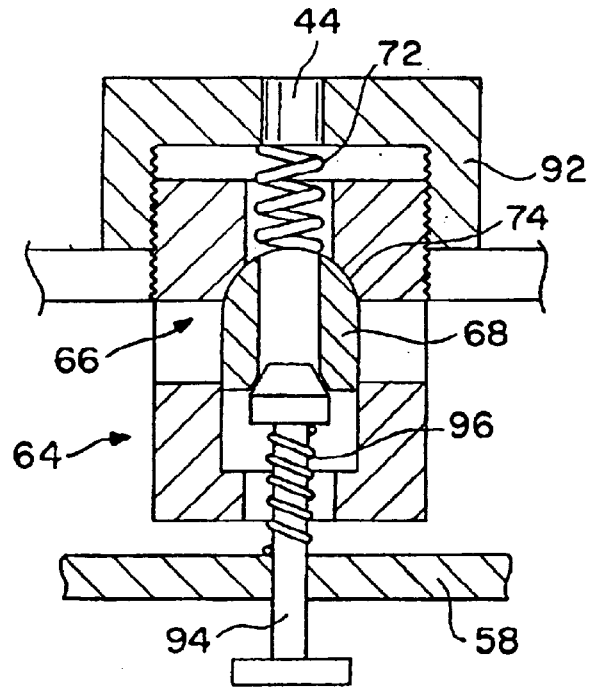
FIGS. 9a through 9c are partial section views through a multi-stage adjustable exhaust valve according to an alternative embodiment.
Figure 9B:
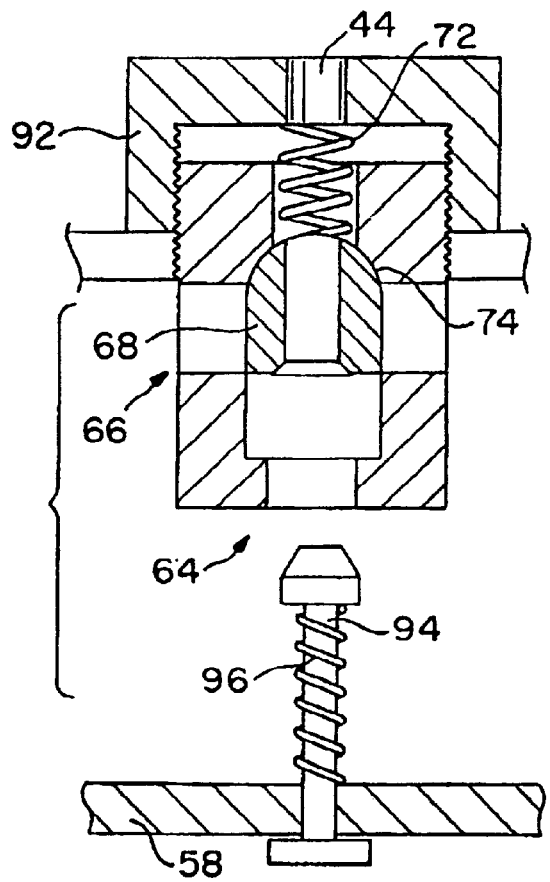
Figure 9C:
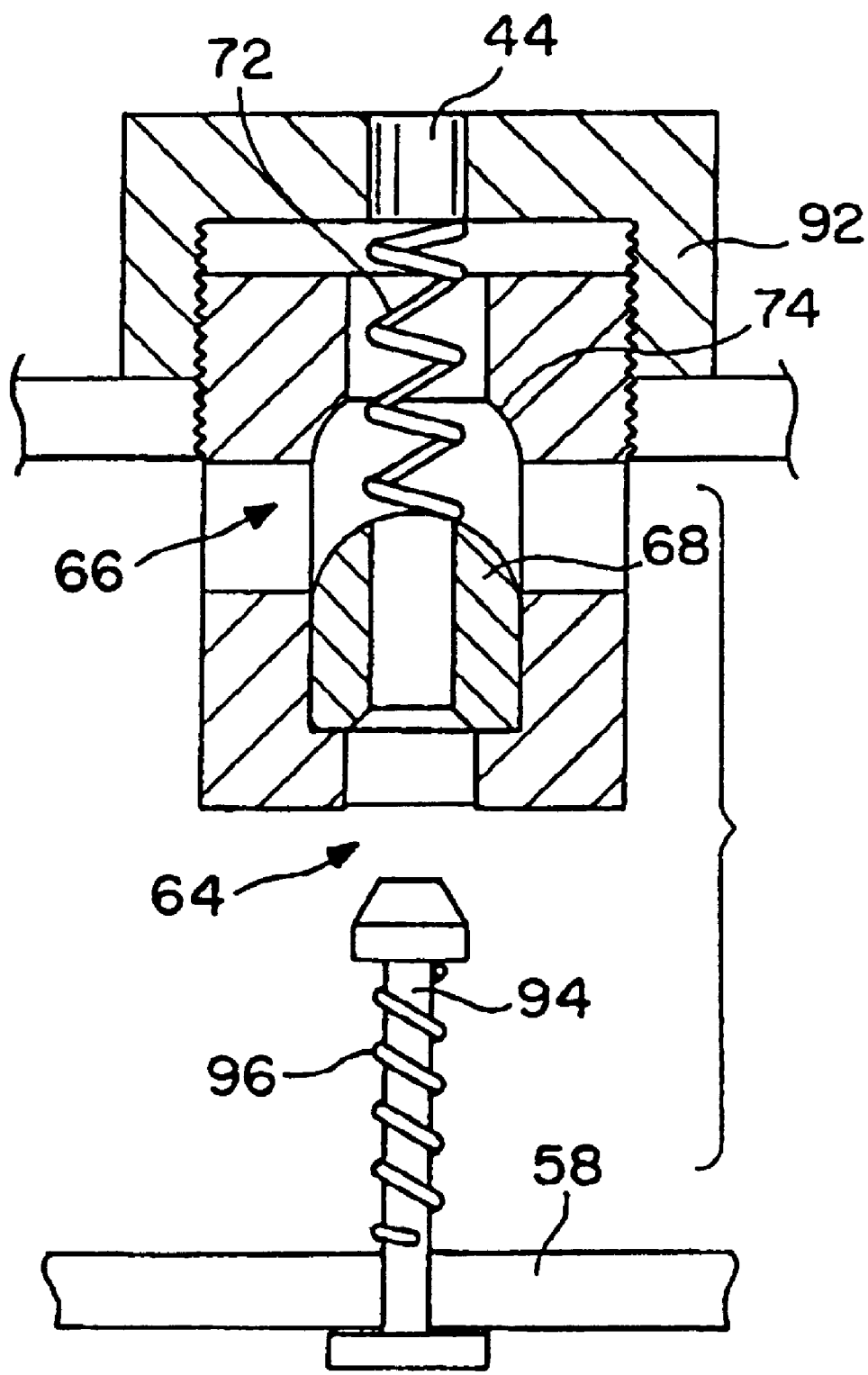

According to FIGS. 5–7, auxiliary pressure exhaust valve 66 is operated in part by the same mechanism that operates the primary gas valves 62, 64, and according to FIG. 8, auxiliary valve 66 can vent into the same conduit as primary exhaust valve 66. The auxiliary valve 66 alternatively can be built into primary pressure exhaust valve 64, as shown in FIGS. 9a–9c. As above, the valve body 68 of the auxiliary pressure exhaust valve opens under spring bias to enlarge a passageway from the tank to the gas exhaust port when tank pressure falls below a threshold. The float or other level responsive mechanism is coupled to the pressure inlet valve and the pressure exhaust valve as in the previous embodiments, for alternatively operating the pressure inlet valve and the pressure exhaust valve such that one is open and one is closed at any time. According to the alternative in FIGS. 9a–9c, the valve body of primary exhaust valve 64 seats at an opening through the valve body 68 of auxiliary exhaust valve 66, which can be a movable spring biased disc with an opening to receive the valve body of primary exhaust valve 64.

When primary exhaust valve 64 is closed, it can positively close auxiliary exhaust valve 66 by mechanical pressure exerted by the valve body of the primary exhaust valve against the auxiliary valve body. The auxiliary valve then is kept closed by operation of the float mechanism rather than only by the level of pressure in the tank. Auxiliary exhaust valve 66 is positively closed during the pumping phase, even when pressure is just beginning to build in the tank and has not reached the threshold at which pressure on the auxiliary valve body overcomes the force of its biasing spring 72 to close auxiliary valve 66. However, the closing apparatus is the primary exhaust valve 64 itself. The threshold in this embodiment can be a substantial proportion of the pumping pressure without unnecessarily venting steam. The auxiliary valve conveniently vents into the same passageway as the primary exhaust valve.

Alternatively, the primary valve body can simply obstruct the exhaust port sufficiently that gas pressure in the tank acts to close the auxiliary exhaust valve. In that case, the primary valve body seals off the pilot hole through the auxiliary valve body, allowing internal tank pressure to force the combined primary and auxiliary valve bodies closed against their respective seats.

FIG. 9b illustrates the position of the valve bodies after switching into the venting/filling phase, before tank pressure has fallen to the point that auxiliary valve 66 opens. In this situation, the cross sectional area of the exhaust flow path is equal to the size of the primary exhaust valve orifice, which extends through the auxiliary exhaust valve body. As the gas pressure falls, with flow restricted, tank pressure continues to hold the auxiliary valve body 68 against its seat. When the pressure falls below the threshold level at which spring 72 overcomes the gas pressure, auxiliary valve 66 opens as shown in FIG. 9c, and the area of the exhaust flow path increases by the difference between the areas of the auxiliary and primary valve orifices.

FIGS. 9a–9c show two additional aspects. According to one aspect, the bias force exerted by spring 72 is made adjustable in this embodiment, by a structure in which an auxiliary valve cap 92 is threaded on the valve's housing, for adjusting the position of the outer end of spring 72 inwardly or outwardly for increasing or decreasing the force of the spring, respectively. According to a second aspect, the primary exhaust valve body is movably mounted on the connecting arm 58 of the level responsive mechanism via a shaft 94 slidable therein. A spring 94 biases the primary valve body toward its limiting position in the direction of the auxiliary valve body 68. Thus the primary exhaust valve can seat dependably over a range of positions of connecting arm 58.

Pump 20 is operated as shown in FIG. 8 by coupling tank 64 between a liquid source 80 and liquid outlet 82 via check valves 32, 34 openable by positive pressure differentials from the source to the outlet such that liquid flows into the tank absent pressure in the tank. Coupling a supply 90 of pressurized gas such as steam to the gas inlet port by the associated gas inlet valve 62 while closing the gas exhaust valve 64, pressurizes the tank to a pumping pressure and forces liquid through the liquid outlet. By then closing gas inlet valve 62 and opening gas exhaust valve 64, pressure in the tank falls and liquid flows into the tank for another cycle. By also opening auxiliary gas exhaust valve 66, at a pressure below the pumping pressure, the invention assists in reducing pressure in tank 24, reduces the time duration of the filling phase, and permits better pumping performance.

If one or more of tank 24, the liquid and the steam are at an elevated temperature sufficient to boil the liquid flowing into or remaining in the tank, auxiliary gas valve 66 vents steam produced by boiling of the liquid. Whether or not such steam is generated, by employing a float mechanism, especially with a snap-over linkage, not only to open and close the gas valves but also to hold closed the valve body of the auxiliary gas exhaust valve when the gas exhaust valve is closed, the pumping performance can be improved further still.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A gas pressure driven fluid pump comprising:
   a pump tank having a liquid inlet with a check valve and a liquid outlet with a check valve, said check valves permitting flow only in a positive pumping direction from the liquid inlet into the pump tank and from the pump tank to the liquid outlet, the pump tank also having a gas inlet port coupleable to a pressurized gas supply for pressurizing the pump tank, and a gas exhaust port for venting pressure in the pump tank;
   a pressure inlet valve for the gas inlet port, a pressure exhaust valve for the gas exhaust port, and a mechanism operable alternately to close the pressure inlet valve while opening the pressure exhaust valve, whereupon pressure in the tank is vented and liquid can flow into the tank through the inlet check valve, and then to open the pressure inlet valve while closing the pressure exhaust valve, whereupon pressure increases in the tank to a pressure level sufficient for urging the liquid to flow through the liquid outlet; and, an auxiliary pressure exhaust valve coupled to the tank and having a valve body biased inwardly of the tank, the auxiliary pressure exhaust valve opening inwardly to relieve pressure in the tank, thereby allowing the liquid to fill the tank more rapidly than as vented by the pressure exhaust valve operated by said mechanism.

2. The gas pressure driven fluid pump according to claim 1, wherein the auxiliary pressure exhaust valve is mounted in a wall of the tank and includes a spring for biasing the valve body to open, the valve body being urged against the spring to close by pressure in the tank over said pressure level for urging the liquid to flow.

3. The gas pressure driven fluid pump according to claim 2, further comprising a threadable adjustment for manually adjusting a biasing force exerted by the spring.

4. The gas pressure driven fluid pump according to claim 1, wherein the auxiliary pressure exhaust valve vents the tank into the gas exhaust port.

5. The gas pressure driven fluid pump according to claim 4, wherein the gas exhaust port is coupled to atmospheric pressure.

6. The gas pressure driven fluid pump according to claim 4, wherein the gas exhaust port is coupled to a pressure greater than atmospheric pressure and the liquid inlet is at a pressure greater than the pressure to which the gas exhaust port is coupled.

7. The gas pressure driven fluid pump according to claim 1, wherein the auxiliary pressure exhaust valve is part of the pressure exhaust valve for the gas port, the valve body of the auxiliary pressure exhaust valve opening to enlarge a passageway from the tank to the gas exhaust port after the pressure exhaust valve opens and at a lower tank pressure.

8. The gas pressure driven fluid pump according to claim 1, further comprising means responsive to a level of the liquid in the tank, operatively coupled to the pressure inlet valve and the pressure exhaust valve, said means alternatively operating the pressure inlet valve and the pressure exhaust valve such that one is open and one is closed at any time.

9. The gas pressure driven fluid pump according to claim 1, wherein the means responsive to the level of the liquid comprises a float and a mechanism coupled between the float and the pressure inlet valve and the pressure exhaust valve.

10. An improved gas pressure driven fluid pump having a pump tank with a liquid inlet and check valve, a liquid outlet and check valve, for flow only in a positive pumping direction, a steam inlet port coupleable to pressurized steam and an exhaust port for venting steam from the pump tank, a steam inlet valve and a pressure exhaust valve for the steam inlet port and the exhaust port, respectively, and a mechanism operable alternately to close the pressure inlet valve while opening the pressure exhaust valve, whereupon pressure in the tank is vented and liquid can flow into the tank through the inlet check valve, and then to open the pressure inlet valve while closing the pressure exhaust valve, whereupon pressure increases in the tank to a pressure level sufficient for urging the liquid to flow through the liquid outlet, the improvement comprising:

an auxiliary pressure exhaust valve coupled to the tank and having a valve body biased to open inwardly of the tank, the auxiliary pressure exhaust valve opening inwardly to relieve pressure in the tank, thereby allowing the liquid to fill the tank more rapidly than as vented by the pressure exhaust valve operated by said mechanism.

11. The improved gas pressure driven fluid pump of claim 10, wherein the auxiliary pressure exhaust valve is mounted in a wall of the tank and includes a spring for biasing the valve body to open, the valve body being urged against the spring to close by pressure in the tank over said pressure level for urging the liquid to flow.

12. The improved gas pressure driven fluid pump of claim 11, further comprising a threadable adjustment for manually fixing a position of the spring in order to set a spring force for biasing the valve body to open.

13. The improved gas pressure driven fluid pump of claim 10, wherein the auxiliary pressure exhaust valve vents the tank into the gas exhaust port.

14. The improved gas pressure driven fluid pump of claim 10, wherein the auxiliary pressure exhaust valve is part of the pressure exhaust valve for the gas port, the valve body of the auxiliary pressure exhaust valve opening to enlarge a passageway from the tank to the gas exhaust port when the pressure exhaust valve opens.

15. A method for pumping a liquid comprising the steps of:

coupling a tank to a liquid source and a liquid outlet via check valves openable by positive pressure differentials from the source to the outlet such that liquid flows into the tank absent pressure in the tank, the tank also having a gas inlet port and a gas exhaust port;

coupling a supply of pressurized steam to the gas inlet port by opening an associated gas inlet valve at the gas inlet port and closing a gas exhaust valve associated with the gas exhaust port, thereby pressurizing the tank to a pumping pressure and forcing the liquid through the liquid outlet;

closing the gas inlet valve and opening the gas exhaust valve, whereupon pressure in the tank falls; and, opening an auxiliary gas exhaust valve at a pressure below the pumping pressure, for assisting in reducing pressure in the tank below a pressure obtained through the gas exhaust valve and the gas exhaust port.

16. The method of claim 15, further comprising providing at least one of the tank, the liquid and the steam at a temperature elevated such that the liquid boils upon introduction of the liquid into the tank and reduction of pressure in the tank, and wherein the auxiliary gas valve vents steam produced by boiling of the liquid.

17. The method of claim 16, further comprising biasing a valve body of the auxiliary gas exhaust valve inwardly of the tank toward an open position via a spring.

18. The method of claim 17, further comprising alternately switching between filling the tank with liquid and pumping the liquid, by control of a float operated mechanism, and further comprising employing the mechanism to hold closed the valve body of the auxiliary gas exhaust valve when the gas exhaust valve is closed.

19. The method of claim 15, comprising venting the tank to atmospheric pressure via the gas exhaust port.

20. The method of claim 15, comprising venting the tank into a closed volume at a pressure above atmospheric pressure via the gas exhaust port, and providing the liquid at the liquid inlet at a pressure higher than said pressure above atmospheric pressure.

21. A steam pressure driven fluid pump comprising:

a pump tank having a liquid inlet with a check valve and a liquid outlet with a check valve, said check valves permitting flow only in a positive pumping direction from the liquid inlet into the pump tank and from the pump tank to the liquid outlet, the pump tank also having a steam inlet port coupleable to a pressurized steam supply for pressurizing the pump tank, and a steam exhaust port for venting pressure in the pump tank;

a pressure inlet valve for the steam inlet port, a pressure exhaust valve for the steam exhaust port, and a mechanism operable alternately to close the pressure inlet valve while opening the pressure exhaust valve, whereupon pressure in the tank is vented and liquid can flow into the tank through the inlet check valve, and then to open the pressure inlet valve while closing the pressure exhaust valve, whereupon pressure increases in the tank to a pressure level sufficient for urging the liquid to flow through the liquid outlet; and, an auxiliary pressure exhaust valve coupled to the tank and having a valve body biased inwardly of the tank, the auxiliary pressure exhaust valve opening inwardly when the tank pressure falls below a predetermined threshold level, such that during liquid filling operation, the pressure exhaust valve opens, reducing tank pressure below the predetermined threshold level, whereupon the auxiliary pressure exhaust valve also opens to facilitate venting additional steam pressure generated when the liquid entering the tank is heated to boiling.

* * * * *